United States Patent [19]
Hatta et al.

[11] Patent Number: 4,797,107
[45] Date of Patent: Jan. 10, 1989

[54] COPYABLE BLACKBOARD

[75] Inventors: Naoyuki Hatta; Hideo Yoshihara; Takeshi Izaki; Akihiro Sawada; Takemi Yamamoto; Kazuo Sangyoji, all of Nagoya, Japan

[73] Assignee: Brother Kogyo Kabushikikaisha, Aichi, Japan

[21] Appl. No.: 52,865

[22] Filed: May 19, 1987

[30] Foreign Application Priority Data

May 19, 1986 [JP] Japan ................................ 61-113874
Dec. 29, 1986 [JP] Japan ............................ 61-200788[U]
Jan. 13, 1987 [JP] Japan ................................ 62-2429[U]
Jan. 23, 1987 [JP] Japan ................................ 62-14817

[51] Int. Cl.⁴ .............................................. H04N 1/10
[52] U.S. Cl. .................................... 434/408; 358/256; 358/285
[58] Field of Search ................. 434/408; 358/256, 285

[56] References Cited
U.S. PATENT DOCUMENTS 4,399,209 8/1983 Sanders et al. .
4,440,846 4/1984 Sanders et al. .
4,587,568 5/1983 Takayama et al. .
4,600,951 7/1986 Blitchington ...................... 358/256
4,667,254 5/1987 Araki et al. ........................ 358/285

Primary Examiner—Leo P. Picard
Attorney, Agent, or Firm—Lowe, Price, LeBlanc, Becker & Shur

[57] ABSTRACT

A copyable blackboard has: a written member on which a picture including such as characters or figures is depicted a first carrier for carrying the written member, a light source for irradiating light to the picture on a portion of the written member located at a predetermined position on the written member to generate an optical signal corresponding to the picture, a photosensitive member which receives the optical signal from the written member and produces a latent image of the picture thereon. A second carrier is provided for carrying the photosensitive member, an image developing element for developing the latent image on the photosensitive member itself or on a copy paper to obtain a copy of the picture, and a control element for controlling the first and second carriers the photosensitive member and the light source.

29 Claims, 8 Drawing Sheets

COPYABLE BLACKBOARD

FIELD OF THE INVENTION

The present invention relates to a copyable blackboard which is provided with a function of copying written matter such as characters or figures which are written on the blackboard.

BACKGROUND ART

The general construction of a known copyable blackboard is illustrated in FIG. 7. A written member 101 comprises a sheet, and 102 and 103 are winding rollers for the written member 101. Furthermore, 104 is a light source, 104 is a light collecting and reflecting mirror, 105 an optical path, the 106 an optical lens, the 107 a CCD image sensor, the 108 a printer, the 109 a board, the 110 a data memory, and the 111 a signal processing circuit.

In this construction, light is irradiated from the light source 104 onto the wound written member 101, and the light reflected therefrom is transmitted onto the CCD image sensor 107 through the optical lens 106 to be focused thereon. In the CCD sensor 107, signal charges which correspond to the light signal converted electrically and stored at the photo diode array are transferred to the CCD analog register to be output as a digital signal successively. This signal is processed or written in into memories, and thereafter sent to the printer 108 as a digital signal. In this printer 108 the picture information such as characters or figures depicted on the written member 101 are output on selected recording paper for example by a heat-sensitive recording method or an electronic photo copying method.

Furthermore, in the exemplary construction illustrated in FIG. 8 a control circuit is provided in addition to the construction of FIG. 7. In FIG. 8, the same reference numerals are used to designate the same or corresponding portions as those shown in FIG. 7. 132 designates an image memory apparatus, 133 an element peripheral circuit, the reference numeral 134 a control circuit, 136 a printing head, the 137 a platen roller, and the 138 a recording paper.

The operation of this copyable blackboard will be described below.

At first, characters or figures are depicted by written members such as a felt pen on the written member 101 which is held in tension and thus provided as a screen. Thereafter, when a predetermined copy button is pushed in order to make a photo copy, the written member 101 is wound around the roller 102 by driving the motor 102', and the light source 104 is switched on so that the emitted light may be irradiated onto the written member 101. This irradiated light is received by a light/electricity conversion element 107 (generally a CCD image sensor is used therefor) through the optical path 105, and the picture information detected by this light/electricity conversion element 107 is stored in the image memory device 132 through the peripheral circuit 133 and the control circuit 134, while it is sent to the printing head 136 through the printing control circuit 135, and it is recorded on the recording member 138 on the platen roller 137 by the printing head 136. Furthermore, the same content can be copied a plurality of times by specifying the number of copies desired during the button switch operation at the start. Then, the picture information stored in the image memory device 132 is sent to the printing head 136 through the control circuit 134, and the printing is effected on the recording member 138 the instructed number of times.

In the prior art copyable blackboard with such a construction, however, a reading section such as the CCD image sensor 107 and an output apparatus such as the printer 108, comprising for example the printing head 136, and the platen roller 137 are required in order to obtain copies of picture information of the written member 101. This makes the structure a complicated one, which leads to an increase in the production cost. Furthermore, a complicated control mechanism such as one including the image memory apparatus 132 is required in order to obtain a plural number of copies, which leads to a further increase in the production cost.

Furthermore, in the prior art copyable blackboard, the picture information on the written member is read out by the reading element such as a CCD image sensor to be converted into a digital signal, and the picture takes in the form of a dot matrix. This results in difficulty in obtaining a clear copied image. That is, the picture information detected by this sensor is output simply as a two-value signal of white and black, and therefore there arises disadvantage that the quality of the copied picture is poor due to reading skip of the respective picture elements and the batter of the picture element.

On the other hand, in order to obtain a high quality clear picture with a simplified structure, it is believed to be preferable to adopt a method of directly copying the picture information from the written member onto the recording member without using elements such as CCD image sensors. However, in this direct copying method high sensitivity recording paper such as heat developing type silver salt photographic paper cannot be used because of the fear of unexpected light exposure, and conventionally only photosensitive carbonless paper or diazo-photosensitive paper was used which has only one several tenth to one several thousandth of the photosensitivity of the heat developing type silver salt photographic paper. Therefore, a long exposure time is required and the copying speed is quite low. In order to enhance this copy speed it is required to use a light source of quite a high illumination but this leads to an extraordinary power consumption.

SUMMARY OF THE INVENTION

An object of the present invention is to provide a copyable blackboard having a high copy quality with a simple construction and a low cost.

A second object of the present invention is to provide an improved copyable blackboard capable of utilizing a high sensitivity recording paper.

A third object of the present invention is to provide an improved copyable blackboard capable of obtaining a plural number of copies with a simple construction.

A fourth object of the present invention is to provide an improved copyable blackboard capable of copying the information written on the material other than the blackboard.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a copyable blackboard comprising a written member on which a picture including characters or figures is depicted; a first carrier means for carrying the written member; a light source for irradiating light to the picture on a portion of the written member to generate an optical signal corresponding to the picture thereat, this portion being located at a predetermined position on the written member; a photosensitive member which receives an optical signal from the written member and produces a latent image of said picture thereon; a second carrier means for carrying the photosensitive member; an image developing means for developing said latent image of said photosensitive member on the photosensitive member itself; and a control means for controlling the driving controls of the first and second carrier means to control the speeds of the written member and the photosensitive members to predetermined values and to control the image developing means and the light source.

DETAILED DESCRIPTION OF THE PREFERRED EMBODIMENTS

In order to explain the present invention in detail, particular reference will be made to FIG. 1.

Figure 1:
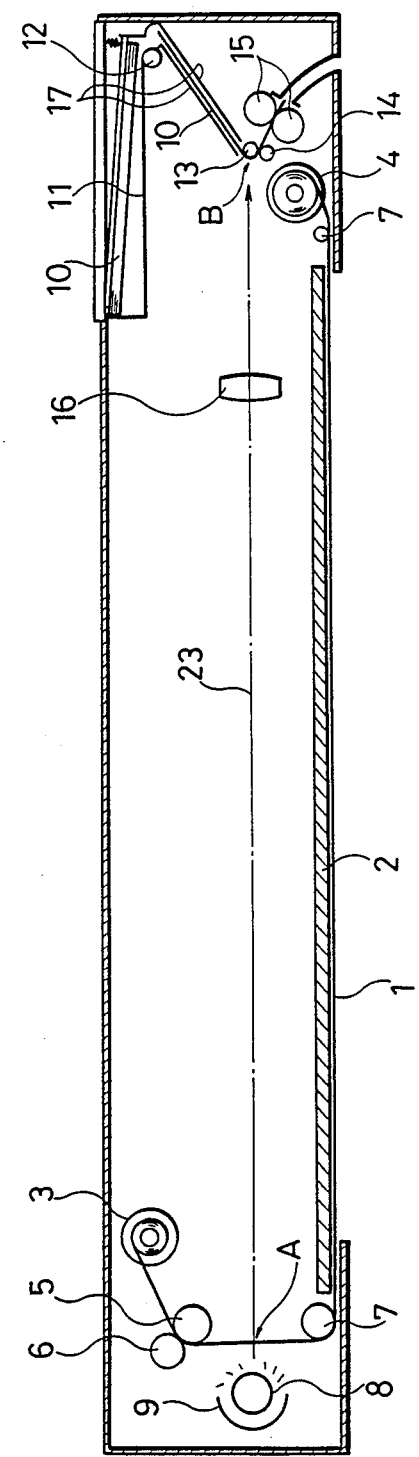
FIG. 1 illustrates the construction of a first preferred embodiment of the present invention.
Figure 2:
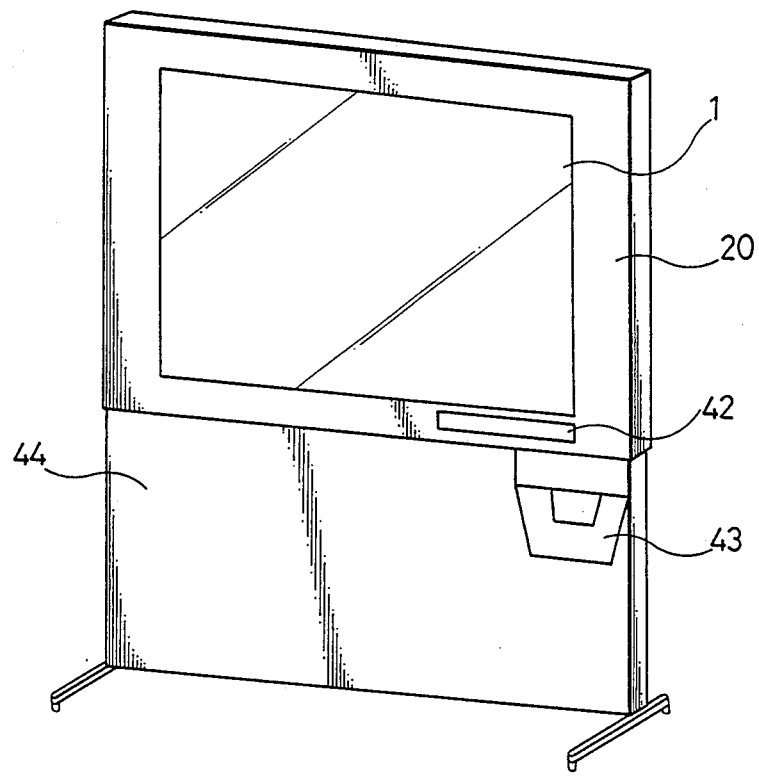
FIG. 2 is a perspective view showing the first embodiment of the present invention.

FIG. 1 shows a copyable blackboard as a preferred first embodiment of the present invention, and FIG. 2 shows a perspective view thereof.

In FIG. 1, the reference numeral 1 designates a light penetrable sheet, the reference numeral 2 designates a white board, the reference numerals 3 and 4 designate winding rollers for winding the light penetrability sheet 1. The reference numerals 5, 6, and 7 designate guide rollers for guiding the light penetrability sheet 1. The reference numeral 8 designates a light source arranged oppositely to the light penetrability sheet 1. The reference numeral 9 designates a reflection mirror arranged to collect the light. The reference numeral 10 designates a photosensitive carbonless paper as a photosensitive member of the present invention. This photosensitive carbonless paper 10 is constituted by a base paper being covered by a microcapsule including light hardening resins, photopolymerization initiator, a color precursor, and a color developer. The color development process is conducted by irradiating light onto the surface of the photosensitive carbonless paper 10, thereby producing a latent image corresponding to the manuscript in accordance with the degree of the light hardening of the microcapsules on the paper, and thereafter applying pressure to destroy the microcapsules to react the color precursor and the color developer. The detailed construction of this photosensitive carbonless paper 10 is described in U.S. Pat. No. 4,440,846. In this case, it is already well known that the microcapsules have a peak sensitivity of light hardening at a light wavelength 385 nm. Reference numeral 11 designates a paper cassette case in which the photosensitive carbonless paper 10 is stored. The reference numeral 12 designates a feed roller for separating the photosensitive carbonless papers 10 one by one in the paper cassette case 11 and feeding the same to the carrier path 17. A pressure roller 15 for sending the photosensitive carbonless paper 10 synchronous with the light penetrable sheet 1 also functions as a roller for applying pressure to the photosensitive carbonless paper 10 after the light exposure thereby to destroy the non-hardened microcapsules on the photosensitive carbonless paper 10. Reference numeral 16 designates an optical lens.

In FIG. 2, the reference numeral 20 designates a panel frame, the reference numeral 44 designates a leg, the reference numeral 42 designates a control panel 42 including a copy button, which is provided at the front side of the panel frame 20. The reference numeral 43 designates a copy paper reception tray.

In this copyable blackboard with such a construction, it is possible to use the blackboard as a usual blackboard by depicting characters or figures, for example by an aqueous black marker on the light penetrable sheet 1. In this case, the reverse side of the light penetrable sheet 1 is supported by the white board 2, and it is easy to write characters on the sheet 1. Furthermore, the characters in black written on the light penetrable sheet 1 are easy to read because the background is white (the surface of the white board 2 at the side of the light penetrable sheet 1 is white).

The device is operated as follows:

When the copy start switch (not shown) on the control panel 42 is turned on in order to copy characters written on the light penetrable sheet 1, the guide rollers 5 and 6 are rotated to send forth the light penetrable sheet 1, and a portion thereof is wound by the film winding roller 3, and thereafter the copy start point of the light penetrable sheet 1 reaches point A of FIG. 1, and the rotations of guide rollers 5 and 6 are stopped. On the other hand, the photosensitive carbonless papers 10 in the paper cassette case 11 are separated one by one by the feed roller 12, and the top ends thereof are carried to the position B and stopped. Next, the light penetrable sheet 1 and the photosensitive carbonless paper 10 are sent synchronous with each other with the light source 8 turned on. At this time, the picture of the light penetrable sheet 1 is reduced to be copied on the photosensitive carbonless paper 10, and on the basis of this reduction ratio the feed rate of the light penetrable sheet 1 against the feed rate of the photosensitive carbonless paper 10 is determined.

The light emitted from the light source 8 selectively penetrates the light penetrable sheet 1, and thereafter it is focused on the photosensitive paper 10 at the point B through the optical lens 16. Now suppose that a fluorescent lamp having light emission wavelength of 385 nm is used for the light source 8. When characters are written on the light penetrable sheet 1, the light from the light source 8 does not penetrate the portions of characters on the light penetrable sheet 1, and the microcapsule of the photosensitive carbonless paper 10 remains unhardened. If nothing is written on the light penetrable sheet 1, the light from the light source 8 reaches the photosensitive carbonless paper 10. The microcapsules painted on the photosensitive carbonless paper 10 are hardened, and the hardened microcapsules and the not-hardened microcapsules produce a latent image on the photosensitive carbonless paper 10. Thereafter, the photosensitive light hardening paper 10 passes between pressure rollers 15 and not-hardened microcapsule are destroyed thereby to conduct a chromophoric fixing treatment. When the copying of the light penetrability sheet 1 is completed, the rotation of the guide roller 5 is halted, and the photosensitive carbonless paper 10 which has received the chromophoric fixing treatment is ejected from the copy paper reception plate 43.

Besides, the film winding rollers 3 and 4, the guide rollers 5 and 6, the feed roller 12, the guide rollers 13 and 14, and the pressure roller 15 are respectively driven by stepping motors, and the stepping motors are controlled by a central control unit such as a microprocessor. Furthermore, the lighting control of the light source 8 is of course conducted by the central control unit.

In this first embodiment, it is not required to provide a complicated apparatus for electrically reading and printing the picture data. This makes the structure a simplified one and makes the maintenance easy. Furthermore, the copying is conducted in an analogue form, and the quality of the copied picture is improved.

Figure 7:
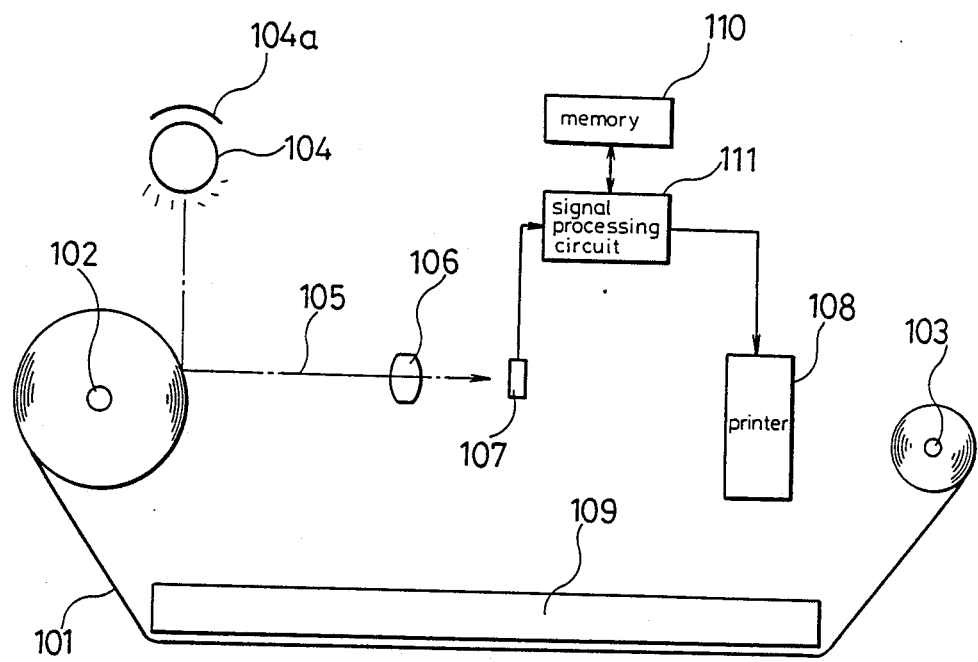
FIG. 7 is a block diagram showing a prior art copyable blackboard.
Figure 8:
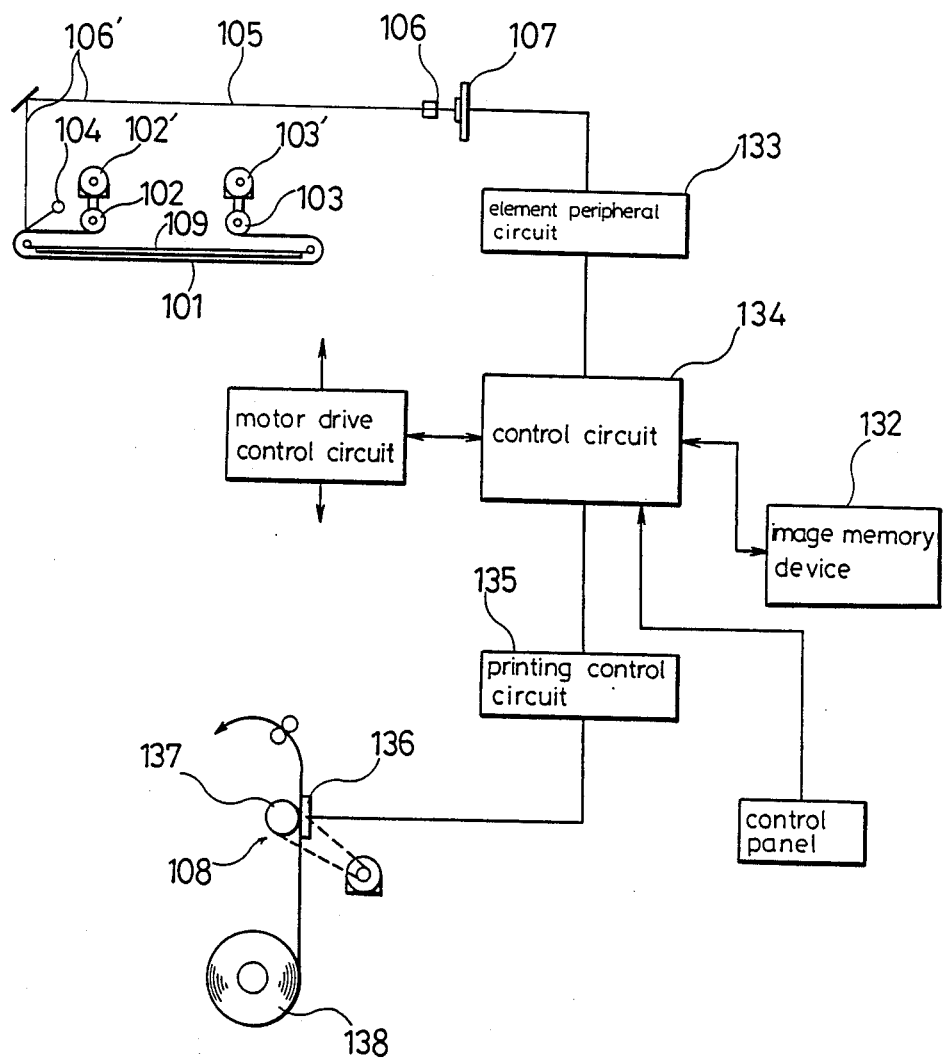
FIG. 8 is a diagram showing a construction of a prior art copyable blackboard.

In the above-illustrated embodiment, the light which has penetrated the light penetrable sheet 1 is projected onto the photosensitive carbonless paper 10 with the use of the light penetrable sheet 1, but it is possible to constitute a reflection type copyable blackboard by replacing the CCD image sensor 107 of FIG. 7 by a photosensitive carbonless paper and replacing the light penetrable sheet 1 by, for example, white polyester sheet.

Furthermore, a diazo photosensitive paper can also be used as an alternative photosensitive carbonless paper.

Figure 3:
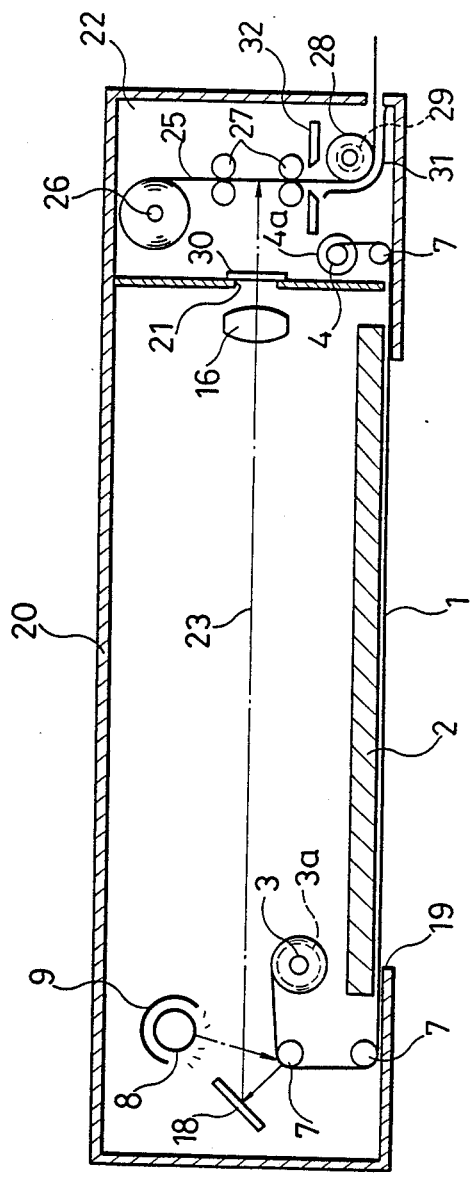
FIG. 3 is a diagram showing the cross-section of a copyable blackboard of a second embodiment of the present invention.

FIG. 3 shows a second embodiment of the present invention. In this second embodiment a shutter for opening or closing the light path is provided on the light path from the written member to the recording member. Furthermore, a heat developing type silver salt photographic paper is used as a recording member and a developing apparatus is used as an image developing means.

A case 20 of this second embodiment using a sheet material as a recording member is box-shaped, and a board 2 is arranged at the internal side of the front side aperture 19 and a dark room 22 is provided at the right side of the inside of the case 20. The light path of the light reflected from the written member 1 is changed rightwards by the light path changing reflection film 18, and it is input into the dark room 22 from the input section 21 through the optical lens 16.

The sheet type recording member 25 is arranged at the rear portion inside the dark room 22 wound around a winding axis 26, and a plurality of feed rollers 27 and guide roller 28 arranged at the former section thereof are rotated by a step motor 29, and the recording member 25 is output from the winding axis 26 and sent out to the outside of the case 20 through the periphery of the guide roller 28. In this embodiment, a heat developing type silver salt photographic paper, e.g., one which is sold under the trade name "Dry Silver" by Sumitomo Three M Co., Ltd., Japan, is used as the recording member 25, and the surface thereof receives the light reflected from the written member 1 and the latent image corresponding to the image on the written member 1 is produced in a reduced state. A shutter apparatus 30 comprising a liquid crystal shutter is provided at the input section 21 of the dark room 22, and only at the input timing of a predetermined electric signal the path from the written member 1 to the recording member 25 is opened, thereby preventing the surface of the recording member 25 from being carelessly subjected to the light exposure. The developing heater 31 constituting a developing apparatus is arranged confronting to the guide roller 28, and a predetermined heat is applied to the recording member 25 thereby to develop the latent image at the surface thereof.

The cutter apparatus 32 comprising a fixed blade and a movable blade arranged at both sides of the recording member 25 in the dark room 22 is used to cut off the recording member 25 at a desired length.

The device is operated as follows.

When a copy start switch (not shown) is turned on, in order to make a copy of an image such as characters and figures depicted on the written member 1, the written member 1 is moved along the board 2 to the winding roller 3 at the left side by the rotation of the step motor 3a. When the copy start point on the written member 1 reaches the position to which the light from the light source 8 is irradiated the light source 8 is turned on and the shutter apparatus 30 is opened at the same time. In this state, the written member 1 and the recording member 25 are sent out by the rotations of the both step motors 3a and 29 synchronously with the respective feed rates determined in accordance with the copy reduction ratio.

Thus, the light irradiated from the light source 8 and reflected from the written member 1 reaches the surface of the recording member 25 through the optical lens 16 and the shutter apparatus 30 as analog data, and at the surface thereof a latent image corresponding to the picture on the written member 1 is clearly produced in analog form in a reduced state. Thereafter, when the recording member 25 is sent out to the external periphery of the guide roller 28, a predetermined quantity of heat is applied thereto by the developing heater 31, and a latent image on the recording member 25 is developed.

In this second embodiment with such a construction, the shutter apparatus 30 is opened only at the copy operation, and therefore the light is allowed to be input to the recording member 25. Thus, the recording member 25 will not be carelessly exposed to the light. Accordingly, a high light sensitivity recording member can be used as the recording member 25, and it is not necessary to provide a high illumination and a corresponding high power consumption light source. Furthermore, the light exposure time at the copying is shortened, thereby increasing the forwarding speeds of the written member 1 and the recording member 25. This results in a relatively short time copying.

In contrast to the prior art device, this embodiment has a simple construction including only a shutter apparatus, and a low cost and maintenance easy device is obtained. Furthermore, heat developing type silver salt photographic paper of high photosensitivity is used as a recording member 25, whereby a reflection latent image method can be used as described above. Especially by adopting this reflection exposure method, it is possible to obtain a much clearer copy without picking up specks of the written member 1 itself differently from the penetration exposure method utilizing the light which has penetrated the written member. Besides, it is possible to lengthen the light path by refracting the light path, resulting in a large reduction ratio.

Furthermore, it is possible to replace the liquid crystal shutter by a mechanical operating shutter and to replace the penetration exposure method by the reflection exposure method within the range of the present invention.

Figure 4:
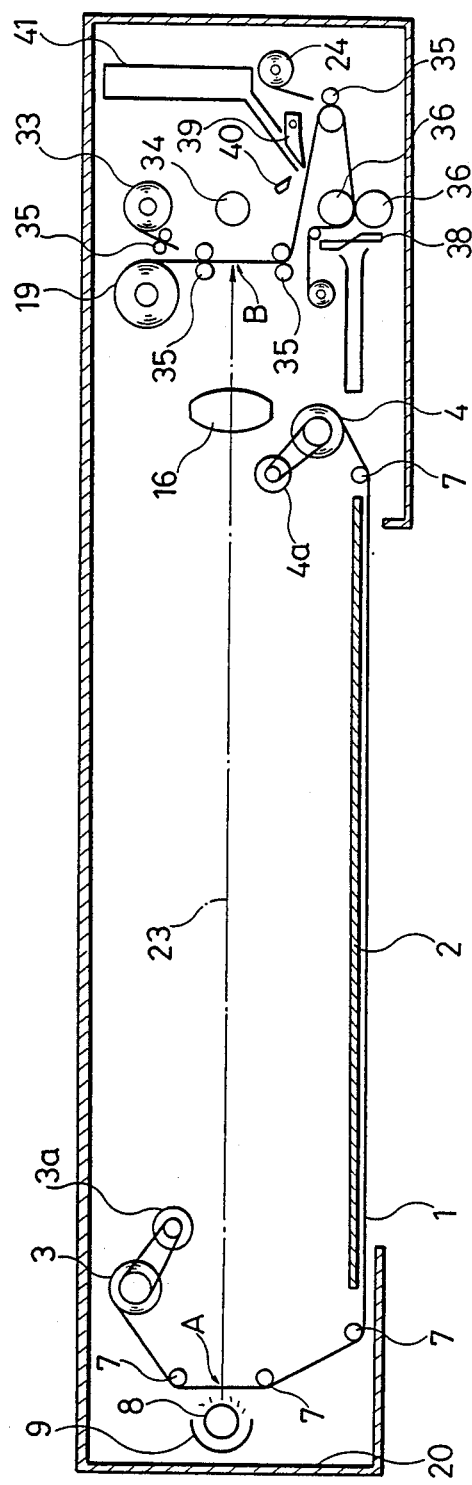
FIG. 4 is a diagram showing the cross-section of a third embodiment of the present invention.

FIG. 4 shows a copyable blackboard as a third embodiment of the present invention. This third embodiment has as its characteristics the capability of obtaining a plural number of copies.

In this third embodiment, a flexible light penetrable sheet 1 as a written member is provided between the winding rollers 3 and 4 through the guide rollers 7, 7, . . . . Reversible motors 3a and 4a are connected to the winding rollers 3 and 4, respectively, and the light penetrable sheet 1 is arranged such that the winding and rewinding thereof can be conducted reversely by changing the rotation directions of the respective motors 3a and 4a. Furthermore, an optical system 23 including an optical lens 16 is arranged in such a manner that the light irradiated from the first light source 8 (for example, fluorescent light) to the light penetrable sheet 1 is focused on the surface of the photosensitive paper 19 which is arranged at the position a predetermined distance apart from the light source 8. As for the photosensitive paper, there is a choice as between a selfchromophoric type and a transcription type, and in this third embodiment the transcription type is used.

That is, microcapsules including such as color precursor, light hardening resin, and photo polymerization initiator are plated to the surface of the photosensitive paper 19. On the other hand, a copy paper 24 having color developer which may provide a color developing reaction with the color precursor in the microcapsules is arranged so as to be output from the copy paper supplying line. An intermediate sheet 33 to which the same kind of color developer is plated is arranged confronting the photosensitive paper 19 at a position on the extended line of the optical system 23. Furthermore, a small light source 34 as a second light source which emits light for projecting the positive image produced on the sheet 33 to the photosensitive paper 19 is arranged at the rear side of the intermediate sheet 33. The photosensitive paper 19, copy paper 24, and intermediate sheet 33 are all in the form of roll papers, and they are sent to pass between the pressure rollers 36 and 36 by the feed rollers 35, 35, . . . . Besides, at the output side of the pressure rollers 36 and 36, a cutter 38 for cutting the copy paper 24 and the photosensitive paper 19 is arranged, and at the carrier line of the intermediate sheet 33, there are arranged a separation plate 39 for separating the sheet 33 and the photosensitive paper 19, and the cutter 40 confronting the separation plate 39 for cutting the intermediate sheet 33. Furthermore, there is also provided a stock case 41 for the intermediate sheet 33 which is cut by the cutter 40.

This device is operated as follows.

Supposed that a copy of a picture including the characters and figures depicted on the sheet 1 is to be made. When the copy start button (not shown) is turned on, the light penetrable sheet 1 is wound by the winding roller 3 by driving the motors 3a and 4a as in the first embodiment of FIG. 1. Thereafter, the copy start point of the sheet 1 reaches point A in FIG. 4 and then the light source 8 is switched on. Then, the light from the light source 8 is irradiated to the surface of the sheet 1, and the light is projected onto point B in FIG. 1 on the reverse side of the photosensitive paper 19 through the optical system 23. The photosensitive paper 19 is sent out synchronously with the winding speed of the light penetrable sheet 1 at a speed determined by the winding speed and a constant reduction ratio. At the picture region of the light penetrable sheet 1 on which characters are written, the light from the light source 8 does not penetrate the light penetrable sheet 1, and the microcapsules on the photosensitive paper 19 remains non-hardened. At the region of the light penetrable sheet 1 where characters are not written, the light from the light source 8 comes onto the photosensitive paper 19, and the microcapsules plated on the photosensitive paper 19 is hardened, and a latent image are produced on the photosensitive paper 19 in accordance with the hardened and unhardened portions of the microcapsules. The light source 8 is turned off after one picture latent image is produced, and the light penetrable sheet 1 is stopped. Thereafter, when the photosensitive paper 19 and the copy paper 24 go through between the pressure rollers 36 and 36, an image is developed on the surface of the copy paper 24. When a copy of a picture is completed on the copy paper 24, the copy paper 24 is cut in a predetermined length by the cutter 38, and it is taken out from the copy paper receiving plate.

Next, in a case where a number of copies are to be obtained, the number of copies is instructed, i.e., entered, at the control panel and a copy start button is turned on, as previously indicated. Then, the light penetrable sheet 1 is wound by the winding roller 3 as before, and when copy start point reaches the point A of FIG. 4, the light source 8 is turned on and the light therefrom is projected onto the photosensitive paper 19. Then the intermediate sheet 33 is sent out at a speed synchronous with that of the photosensitive paper 19, and the intermediate sheet 33 goes out through the pressure rollers 36 and 36 overlapped with the photosensitive paper 19. Then, the color precursor in the destroyed microcapsules and the color developer on the intermediate sheet 33 react with each other to develop colors on the intermediate sheet 33, and the picture on the light penetrable sheet 1 is produced in a reduced state. Next, the intermediate sheet 33 is rewound, and the start point of the image produced on the intermediate sheet 33 is moved back towards the position of the point B. After the movement, a small light source 34 is turned on, and the photosensitive paper 19 is subjected to light exposure thereby through the intermediate sheet 33. Then, a latent image is produced on the photosensitive paper 19 subjected to this light exposure selectively in accordance with the image produced on the intermediate sheet 33. After the production of the latent image, the intermediate sheet 33 is stripped off from the photosensitive paper 19 by the separation plate 39 to be sent out to the stock case 41. The photosensitive paper 19 on which a latent image is produced goes through between the pressure rollers 36 and 36 with the copy paper 24 and the transfer of the latent image on the photosensitive paper 19 onto the copy paper 24 is conducted through the same process through which a picture is produced on the intermediate sheet 33. When a copy of a picture is completed, the copy paper 24 is cut off at a predetermined length by the cutter 38 and, as before, it is taken out from the copy paper receiving plate. Until a required number of copies are obtained the intermediate sheet 33 is repeatedly rewound and, when they are obtained, the sheet 33 is cut by the cutter 40 and stored at the stock case 41.

In this third embodiment with such a construction, a good quality copy is obtained due to the good characteristics of the photosensitive paper. Furthermore, a required number of copies can be obtained, and this is advantageous in use, e.g., at conferences. Furthermore, the apparatus of this embodiment is constituted by using only an optical means which is relatively simple in construction, and the production cost of the apparatus is therefore quite low.

In the above-described embodiment, a light penetrable sheet 1 is used as a written member, but it is of course possible to use a reflection type sheet such as a white polyester sheet in place of light penetrability sheet 1.

Furthermore, the present invention is not restricted to a copyable blackboard having a reversible type written member as described above, but can also be applied to that having an endless sheet with the same effects as described above.

In the above-described embodiment, the use of a roller type of photosensitive paper 19, copy paper 24, or intermediate sheet 33 is discussed, but cut papers can also be used instead. Furthermore, a self-color-developing type can also be used.

Figure 5:
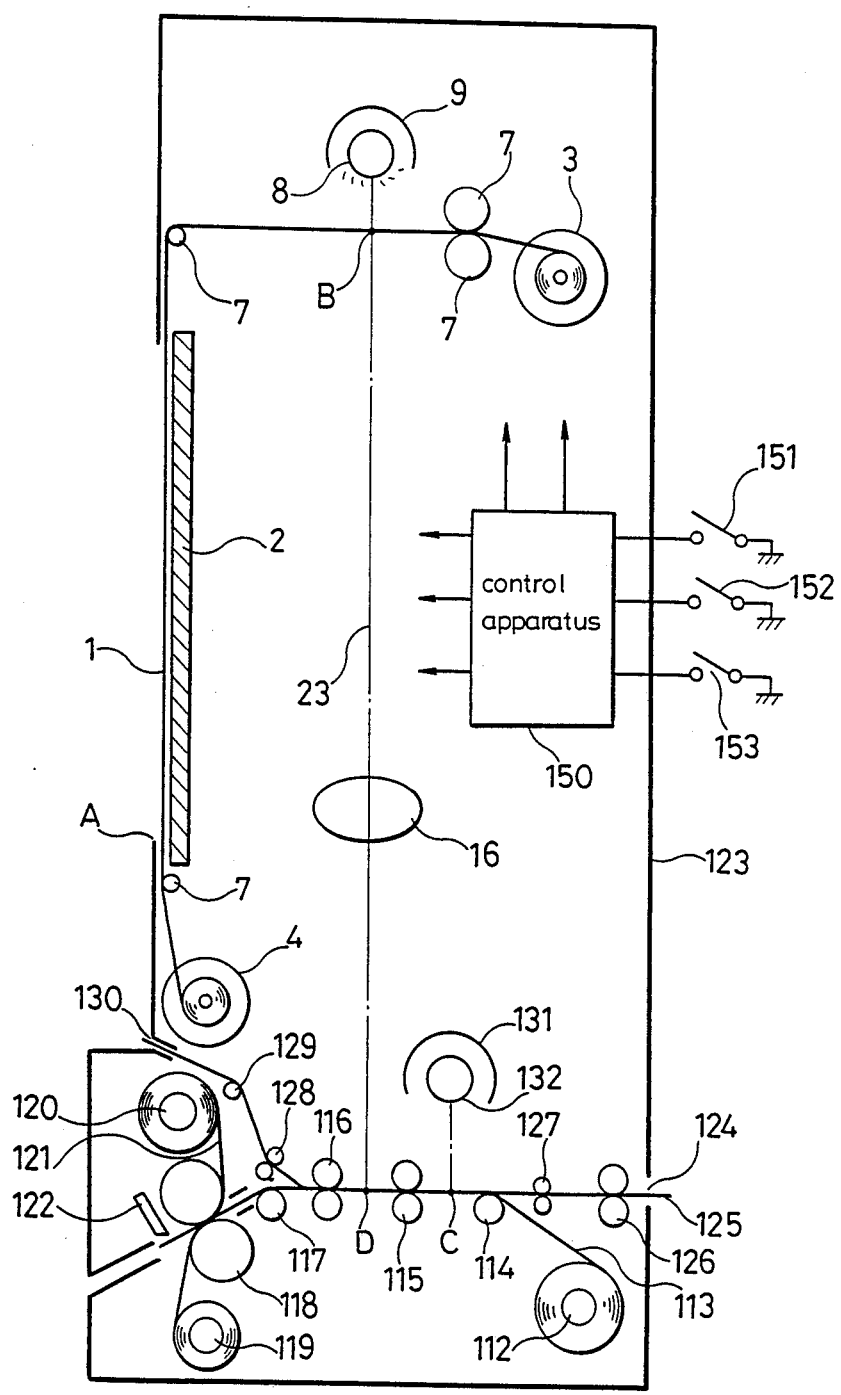
FIG. 5 is a diagram showing the cross-section of a fourth embodiment of the present invention.
Figure 6:
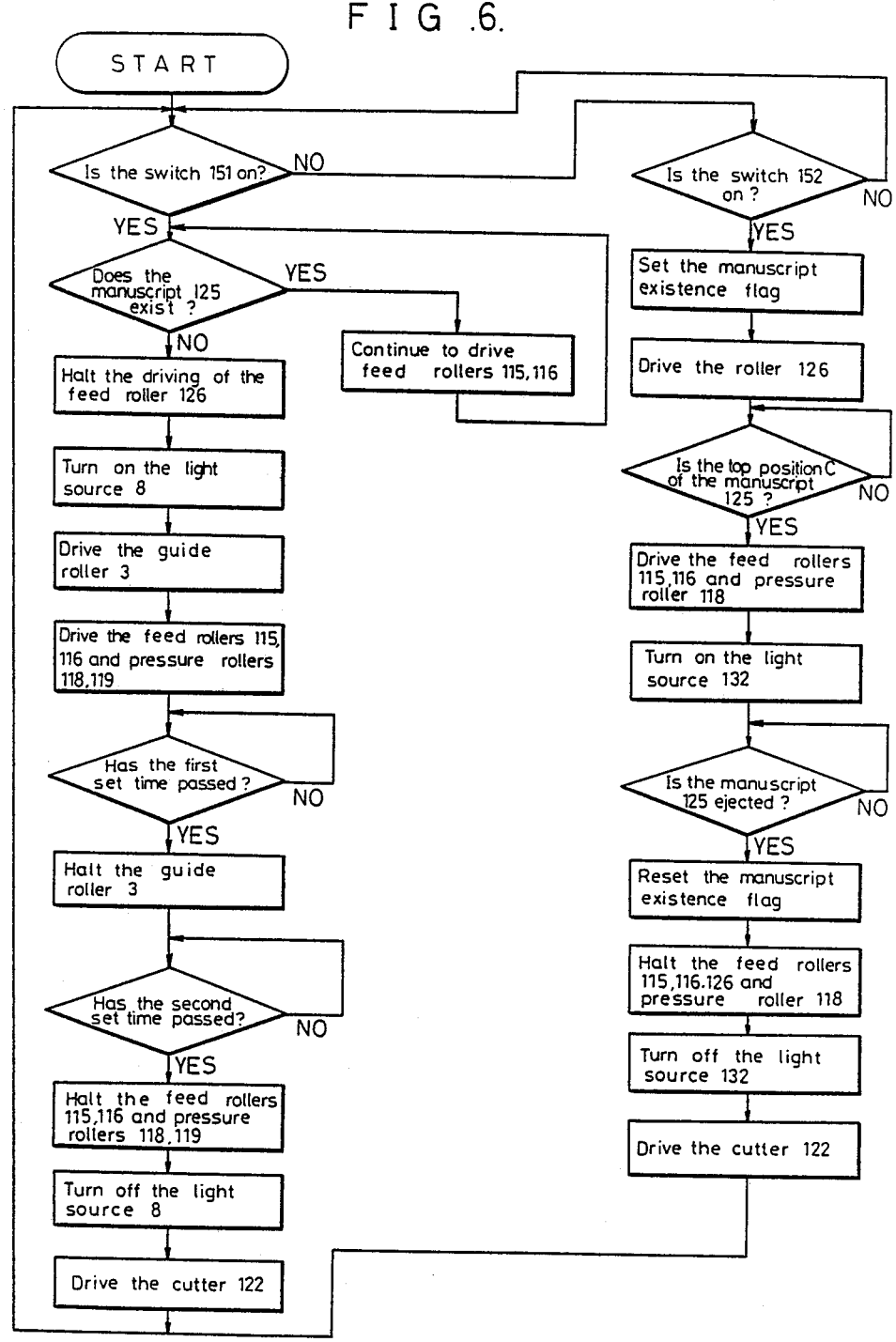
FIG. 6 shows a flowchart for exemplifying the operation of the device of a fourth embodiment.

FIGS. 5 and 6 illustrate a fourth embodiment of the present invention.

In FIG. 5, the same reference numerals designate the same or corresponding elements as those shown in FIG. 1. There is provided a manuscript insertion slit 124 at the case 123, and the manuscript 125 inserted into the manuscript insertion slit 124 is carried out in a state where it is mounted on the photosensitive carbonless paper 113 by the feed roller 126, guide rollers 127, 114, and feed rollers 115, 116. The manuscript 125 is separated by the guide roller 128 to be guided by the guide roller 129, and it is ejected from the manuscript ejection slit 130 which is provided at a case 123. Furthermore, a light from the light source 132 collected by the reflection mirror 131 is irradiated onto the photosensitive carbonless paper 113 through the manuscript 125.

Herein, the winding rollers 3, 119, the feed rollers 7, 115, 116, 126, and the pressure roller 118 are preferably driven by elements such as pulse motors, and the driving and halting thereof are controlled by the output of the control apparatus 150, which will be described later. As before, the turning on or off of the light sources 8 and 132 and the driving or halting of the cutter 122 are also controlled by the output of the control apparatus 150. The copy instruction for copying the information depicted on the blackboard is given manually, and the insertion and ejection of the manuscript 125 are detected by the insertion detection switch (not numbered) and the ejection detection switch which are provided at the manuscript insertion slit 124 and the manuscript ejection slit 130, respectively.

This device is operated as follows.

At first, the copy instruction switch 151 is turned on. Then, until a manuscript is provided it is detected that there is no manuscript between the manuscript insertion slit 124 and the manuscript ejection slit 130. When it is detected that the manuscript 125 exists, the feed rollers 115 and 116 are driven until the manuscript 125 is ejected. The completion of the manuscript ejection is detected by checking a flag which is reset by the ejection detection switch 153. When the manuscript ejection is completed, the feed roller 126 is controlled to be at a starting state, and the carrying of the new manuscript 125 is inhibited.

When the feed roller 126 is controlled to be at a halting state, the light source 8 is turned on. Thereafter, when the feed roller 7 is driven the winding roller 3 is driven at a rotation speed in correspondence with the rotation of the feed roller 7. By this rotation, the light penetrability sheet 1 which is wound around the supply roller 4 is wound around the winding roller 3.

Synchronous with the driving of rotation of the feed roller 7 the feed rollers 115 and 116, the pressure roller 118, and the rewinding roller 119 are driven to rotate. As a result, photosensitive carbonless paper 113 is transferred synchronous with the movement of the light penetrable sheet 1, and the recording paper 121 is overlapped on the photosensitive carbonless paper 113 between the pressure roller 118, 118.

On the other hand, the light from the light source 8 irradiated onto the light penetrable sheet 1 penetrates the light penetrability sheet 1 selectively in accordance with the information written thereon, and the image carried by the penetrated light is reduced by the optical lens system 16. Accordingly, information on the light penetrable sheet 1 is focused on the photosensitive carbonless paper 113 with reduced by the degree of the reduction ratio of the optical lens system 16. The feed rate of the photosensitive carbonless paper 113 against that of the light penetrable sheet 1 is determined in accordance with this reduction ratio.

By the focusing of the information on the photosensitive carbonless paper 113, the light from the light source 8 does not penetrate the portions of the light penetrability sheet 1 where characters are written, e.g., by a marker, and the light hardening microcapsules at this point of the photosensitive carbonless paper 113 remain unhardened. The light from the light source 8 penetrates the sheet 1 at portions where characters are written, and the light hardening microcapsules at these portions of the photosensitive carbonless paper 113 are hardened. Accordingly, a latent image is produced on the photosensitive carbonless paper 113 constituted by the hardened portion and the non-hardened portion of the light hardening microcapsules in accordance with the information depicted on the light penetrability sheet 1.

The photosensitive carbonless paper 113 on which a latent image is produced is transferred to reach the pressure roller 118, and the recording paper 121 is pressured by the pressure roller 118 with said recording paper 121 mounted on the pressure roller 118, and the microcapsules are on the non-hardened portion of the photosensitive carbonless paper 113 are destroyed, and an image is developed and fixed on the surface of the recording paper 121, and thus copying is conducted. The photosensitive carbonless paper 113 which passes through the pressure roller 118 is wound around the winding roller 119. On the other hand, when a predetermined time (a first set time) has passed after the feed rollers 115 and 116, the pressure roller 118, and the winding roller 119 are driven, the driving of the feed roller 7 and the winding roller 3 is stopped. By this, the carrying of the light penetrable sheet 1 is stopped. The light penetrability sheet 1 is stopped when a portion of the light penetrable sheet 1 located at the position confronting the lower end A of the aperture of the case 123 has reached the position where it receives light from the light source 8.

Next, when a predetermined time (a second set time) has passed after the driving of the feed roller 7 and the winding roller 3 is stopped, the driving of the feed rollers 115, 116, the pressure roller 118, and the winding roller 119 is also stopped, and the light source 8 is turned off. Accordingly, during a period of time when the photosensitive paper 113 is substantially located at the copy start point to the time when the second set time has passed the light source 8 is kept on, and the carrying of the photosensitive carbonless paper 113 is continued. Then, the light penetrability sheet 1 is stopped, and the portion A of the light penetrability sheet 1 is located at a position to receive the light from the light source 8. At this portion A information is not depicted, and the light hardening microcapsules of the photosensitive carbonless paper 113 become hardened. When the second set time has passed, the cutter 122 is driven, the recording paper 121 is cut off, and the copying of the information depicted at the blackboard portion is completed. Besides, the length portion of the photosensitive paper from the position confronting the cutter 122 to the position D at which an image is focused by the optical lens system 16 corresponding to the length of the photosensitive carbonless paper 113 running during the second set time becomes a front side end blank. The length portion of the photosensitive paper ejected from the pressure roller 118 corresponding to the length of the photosensitive paper 113 running during a time period from the conclusion of the first set time to the start of the second set time becomes a rear side end blank.

The operation of making a copy of a manuscript other than with the light penetrable sheet 1 will now be described.

When copying of the manuscript 125 is to be conducted the manuscript 125 is inserted into the manuscript insertion slit 124. The insertion of the manuscript 125 is detected by the insertion detecting switch 152. By that the insertion detecting switch 152 is turned on, a flag indicated that the manuscript 125 exists is set, and the feed roller 126 is driven. By this driving the manuscript 125 is carried, and by this carrying when the top end of the manuscript 125 reaches the position C where it receives the light from the light source 132, the feed rollers 115 and 116 and the pressure roller 118 are driven, and the light source 132 is turned on.

As a result, the manuscript 125 is carried with and mounted on the photosensitive carbonless paper 113. In the midst of this carrying the light from the light source 132 is irradiated through the manuscript 125. Accordingly, a latent image is produced on the photosensitive carbonless paper 113 in accordance with the information such as the characters on the manuscript 125. Herein, with light from the light source 132 irradiated onto the photosensitive carbonless paper 113 through the manuscript 125, a latent image is produced on the photosensitive carbonless paper 113 by a light which has penetrated the manuscript 125 and which has a sufficient intensity to produce a latent image.

The significance of the fact that the light which has penetrated the manuscript has a sufficient intensity to produce a latent image can be easily understood by comparison with a case where the reflectivity of the light from the manuscript surface is about 1% in the prior art reflection type copy machine. During the carrying of the photosensitive carbonless paper with the manuscript 125, the manuscript 125 is separated by the guide roller 128, and the separated manuscript 125 is then ejected from the manuscript ejection slit 130. When the end of the manuscript 125 is ejected from the manuscript ejection slit a flag indicating the existence of the manuscript 125 is reset. The photosensitive carbonless paper 113 from which the manuscript 125 is separated is pressured in a state where the recording paper 121 is mounted thereon by the pressure roller 118, and the latent image is developed to be fixed onto the recording paper 121 thereby to make a copy. Furthermore, when the above-described flag is reset the drivings of the feed rollers 115, 116, 126 and the pressure roller 118 are stopped, and the light source 132 is turned off. Subsequently, the cutter 122 is driven, and the recording paper 121 is cut off to conclude the copying.

In this fourth embodiment with such a construction it is possible to selectively make a copy of a manuscript and a copy of the information depicted on the written member. Furthermore, it is possible to make a desired number of copies using a latent image which is transferred by light exposure using the light from the first light source as a manuscript.

In the above-described embodiment, the copy instruction for copying the manuscript 125 may be made superior to the copy instruction by the copy instruction switch 151. Furthermore, the photosensitive carbonless paper and the manuscript can be carried together.

Furthermore, in the above-described fourth embodiment light transmission is conducted by irradiating light from the light source 8 onto the light penetrable sheet 1, but the irradiation of light onto the light penetrable sheet 1 may be conducted by a reflection type system.

Furthermore, in the above-described first, third, and fourth embodiments, a photosensitive carbonless paper which is recited in U.S. Pat. No. 4,399,209 is used as a photosensitive carbonless paper 113, but a photosensitive carbonless paper like that recited in U.S. Pat. No. 4,440,846 can also be used instead. In this case, the winding roller may be removed, and the photosensitive carbonless paper may be ejected from the pressure rollers to the outside of the case. Furthermore, diazo photosensitive paper can also be used.

As is evident from the foregoing description, according to the present invention, a picture on a written member is directly copied on a copy paper through an optical system in an analog form, whereby a simplified and easily maintained copyable blackboard is obtained.

What is claimed is:

1. A copyable blackboard comprising:
 a written member on which is depicted a picture comprising data such as characters or figures;
 first carrier means for carrying said written member;
 light source for irradiating light to said picture on a portion of said written member to generate an optical signal corresponding to said picture, said portion being located at a predetermined position on said written member;
 photosensitive member which receives said optical signal from said written member and thereby produces a corresponding latent image of said picture;
 second carrier means for carrying said photosensitive member;
 image developing means for developing said latent image of said photosensitive member on the photosensitive member itself; and
 control means for controlling said first and second carrier means to control feeding speeds of said written member and said photosensitive member to values determined to correspond to a preselected picture reduction ratio and to also control said image developing means and said light source.

2. A copyable blackboard as defined in claim 1, wherein:
said written member is opaque, and light reflected therefrom is utilized to make a copy of said picture.

3. A copyable blackboard as defined in claim 1, wherein:
said written member is a light penetrable sheet, and light which has penetrated said written member is utilized to make a copy of said picture.

4. A copyable blackboard as defined in claim 1, wherein:
said photosensitive member is a photosensitive carbonless paper.

5. A copyable blackboard as defined in claim 1, wherein:
said image developing means comprises a pressure roller.

6. A copyable blackboard as defined in claim 1, further comprising:
means for transferring the developed latent image from the photosensitive member to a copy paper to produce a copy of the picture thereon.

7. A copyable blackboard as defined in claim 1, wherein:
said photosensitive member is a diazo copy paper.

8. A copyable blackboard comprising:
a written member on which is depicted a picture comprising data such as characters or figures;
first carrier means for movably carrying said written member;
light source means for irradiating light to said picture on a portion of said written member to generate an optical signal corresponding to said picture, which portion is located at a predetermined position;
photosensitive means for receiving said optical signal from said written member and thereby producing a corresponding latent image of said picture;
second carrier means for movably carrying said photosensitive means;
shutter means for opening and closing a light path from said written member to said photosensitive means, provided on said light path;
image developing means for developing said latent image of said photosensitive means on the photosensitive means itself; and
control means for controlling said first and second carrier means, said image developing means and said light source means.

9. A copyable blackboard as defined in claim 8, wherein:
said photosensitive means comprises a heat-developing-type silver salt photographic paper, and said image developing means comprises developing equipment therefor.

10. A copyable blackboard as defined in claim 8, wherein:
said shutter apparatus comprises a mechanical shutter.

11. A copyable blackboard as defined in claim 8, further comprising:
means for transferring the developed latent image from the photosensitive member to a copy paper to produce a copy of the picture thereon.

12. A copyable blackboard as defined in claim 8, wherein:
said shutter apparatus comprises a liquid shutter.

13. A copyable blackboard as defined in claim 8, wherein:
said written member is opaque, and light reflected therefrom is utilized to make a copy of said picture.

14. A copyable blackboard as defined in claim 8, wherein:
said written member is a light penetrable sheet, and light which has penetrated said written member is utilized to make a copy of said picture.

15. A copyable blackboard, comprising:
a written member on which is depicted a picture comprising data such as characters or figures;
first carrier means for movably carrying said written member;
first light source means for irradiating light to said picture on a portion of said written member to generate an optical signal corresponding to said picture said portion being located at a predetermined position;
means for supplying a manuscript bearing optically determinable data onto said photosensitive member from the outside;
second light source means for irradiating light to said manuscript to generate an optical signal corresponding to said data thereon;
photosensitive means for receiving light from said second light source means which has penetrated said manuscript, thereby to produce a latent image corresponding to said optical signal;
second carrier means for movably carrying said photosensitive means;
means for supplying said manuscript onto said photosensitive member from the outside;
second light source for irradiating light to said manuscript which is supplied onto said photosensitive member;
image developing means for developing said latent image on said photosensitive means itself; and
control means for controlling said first and second carrier means, said image developing means and said first and second light source means.

16. A copyable blackboard as defined in claim 15, wherein:
said written member is a light penetrable sheet, and light which has penetrated said written member is utilized to make a copy corresponding to said latent image.

17. A copyable blackboard as defined in claim 15, wherein:
said photosensitive member is a photosensitive carbonless paper.

18. A copyable blackboard as defined in claim 15, wherein:
said image developing means comprises a pressure roller.

19. A copyable blackboard as defined in claim 15, further comprising:
means for transferring the developed latent image from the photosensitive member to a copy paper to produce a copy of the picture thereon.

20. A copyable blackboard as defined in claim 15, wherein:
said photosensitive member is a diazo copy paper.

21. A copyable blackboard as defined in claim 15, wherein:

said written member is opaque, and light reflected therefrom is utilized to make a copy of said picture.

22. A copyable blackboard as defined in claim 15, wherein:
said latent image corresponds to said picture on said written member.

23. A copyable blackboard as defined in claim 15, wherein:
said latent image corresponds to data from said manuscript.

24. A copyable blackboard, comprising:
a written member on which is depicted a picture comprising data such as characters or figures;
first carrier means for movably carrying said written member;
first light source means for irradiating light to a picture on a portion of said written member to generate an optical signal corresponding to said picture, said portion being located at a predetermined position on said written member;
a recording member;
means for supplying an intermediate film sheet onto said recording member;
photosensitive means for receiving said optical signal from said written member and thereby producing a corresponding latent image of said picture;
second carrier means for movably carrying said photosensitive means;
image developing means for developing said latent image of said photosensitive means on said photosensitive means itself;
second light source means for irradiating light to said intermediate sheet, thereby to produce a latent image on said photosensitive means; and
control means for controlling said first and second carrier means, said light developing means and said first and second light source means.

25. A copyable blackboard as defined in claim 24, wherein:
said written member comprises a white polyester sheet and said optical signal, generated by light reflected from said written member, is utilized to make a copy.

26. A copyable blackboard as defined in claim 24, wherein:
said written member is a light penetrable sheet, and light which has penetrated said written member is utilized to make a copy.

27. A copyable blackboard as defined in claim 24, wherein:
said photosensitive member comprises a photosensitive paper.

28. A copyable blackboard as defined in claim 24, wherein:
said image developing means comprises a pressure roller.

29. A copyable blackboard as defined in claim 24, further comprising:
means for transferring the developed latent image from the photosensitive member to a copy paper to produce a copy of the picture thereon.

* * * * *